United States Patent
Masuda et al.

(10) Patent No.: US 10,851,449 B2
(45) Date of Patent: Dec. 1, 2020

(54) THERMAL SPRAY SLURRY

(71) Applicant: FUJIMI INCORPORATED, Kiyosu (JP)

(72) Inventors: Takaya Masuda, Aichi (JP); Hiroyuki Ibe, Aichi (JP); Kazuya Sugimura, Aichi (JP)

(73) Assignee: FUJIMI INCORPORATED, Kiyosu (JP)

( * ) Notice: Subject to any disclaimer, the term of this patent is extended or adjusted under 35 U.S.C. 154(b) by 316 days.

(21) Appl. No.: 15/923,877

(22) Filed: Mar. 16, 2018

(65) Prior Publication Data

US 2018/0274078 A1 Sep. 27, 2018

(30) Foreign Application Priority Data

Mar. 21, 2017 (JP) ................. 2017-054333

(51) Int. Cl.
  *C23C 4/11* (2016.01)
  *C09D 1/00* (2006.01)
  *C23C 4/134* (2016.01)

(52) U.S. Cl.
  CPC ................. *C23C 4/11* (2016.01); *C09D 1/00* (2013.01); *C23C 4/134* (2016.01)

(58) Field of Classification Search
  None
  See application file for complete search history.

(56) References Cited

U.S. PATENT DOCUMENTS

2016/0024328 A1* 1/2016 Kitamura ................. C23C 4/11
  106/287.17

FOREIGN PATENT DOCUMENTS

| JP | 2010-150617 A | 7/2010 |
| JP | 2016-138309 A | 8/2016 |

* cited by examiner

*Primary Examiner* — Colin W. Slifka
(74) *Attorney, Agent, or Firm* — Foley & Lardner LLP

(57) ABSTRACT

Provided is thermal spray slurry capable of forming a dense coating by thermal spraying while suppressing cracks. Thermal spray slurry includes: thermal spray particles having an average particle diameter of 1 μm or more and 10 μm or less and a dispersion medium in which the thermal spray particles are dispersed, and has a filling rate of 84 mass % or less, the filling rate being calculated by the following expression, filling rate (mass %)=$B/A$×100, where A denotes the mass of cake of the thermal spray particles obtained by precipitating the thermal spray particles out of the thermal spray slurry by centrifugation, and B denotes the mass of a dry matter obtained by removing the dispersion medium from the cake.

10 Claims, No Drawings

THERMAL SPRAY SLURRY

BACKGROUND OF THE INVENTION

Field of the Invention

The present invention relates to slurry for thermal spray slurry.

Description of the Related Art

Thermal spraying is technology to spray a material to be thermal-sprayed to a substrate and form a coating on the substrate. To this end, a known method prepares slurry by dispersing particles to be thermal-sprayed in a dispersion medium (see Patent Literature (PTL) 1, for example).

Although thermal spraying using such slurry easily forms a dense (with less pores) coating, the coating may have cracks.

CITATION LIST

Patent Literature

PTL 1: JP 2010-150617 A

SUMMARY OF THE INVENTION

The present invention aims to provide thermal spray slurry capable of forming a dense coating by thermal spraying while suppressing cracks.

Thermal spray slurry according to one aspect of the present invention contains thermal spray particles having an average particle diameter of 1 μm or more and 10 μm or less and a dispersion medium in which the thermal spray particles are dispersed, and has a filling rate of 84 mass % or less, the filling rate being calculated by the following expression.

Filling rate (mass %)=$B/A\times100$, where A denotes the mass of cake of the thermal spray particles obtained by precipitating the thermal spray particles out of the thermal spray slurry by centrifugation, and B denotes the mass of a dry matter obtained by removing the dispersion medium from the cake.

The present invention allows the formation of a dense coating by thermal spraying while suppressing cracks.

DESCRIPTION OF THE PREFERRED EMBODIMENTS

The following describes one embodiment of the present invention in details. The following embodiment illustrates one example of the present invention, and the present invention is not limited to the embodiment. The following embodiment can be changed and modified variously, and the present invention can cover such a changed or modified embodiment.

Thermal spray slurry of the present embodiment contains thermal spray particles having an average particle diameter of 1 μm or more and 10 μm or less and a dispersion medium in which these thermal spray particles dispersed. The thermal spray slurry has a filling rate of 84 mass % or less, the filling rate being calculated by the following expression, filling rate (mass %)=$B/A\times100$, where A denotes the mass of cake of the thermal spray particles obtained by precipitating the thermal spray particles out of the thermal spray slurry by centrifugation, and B denotes the mass of a dry matter obtained by removing the dispersion medium from the cake. When the thermal spray slurry includes a small amount of additive, A and B in the above expression may be the mass of the cake or the dry matter that includes such small amount of additive.

Thermal spraying using such thermal spray slurry enables the formation of a dense coating while suppressing cracks.

The following describes the thermal spray slurry of the present embodiment, a method for manufacturing such thermal spray slurry, and a method for forming a coating by thermal spraying using such thermal spray slurry in more details.

Thermal spray slurry of the present embodiment contains thermal spray particles having an average particle diameter of 1 μm or more and 10 μm or less and a dispersion medium in which particles are dispersed, and has a filling rate of 84 mass % or less. A method for manufacturing thermal spray slurry having the filling rate of 84 mass % or less is not limited especially, and the thermal spray slurry may be manufactured in one stage or in two stages.

For a method for manufacturing thermal spray slurry in one stage, thermal spray particles having various particle diameters may be mixed and dispersed in a dispersion medium so that the filling rate is 84 mass % or less.

A method for manufacturing thermal spray slurry in two stages may include: a raw-material slurry preparation step of dispersing thermal spray particles in a dispersion medium to prepare a plurality of types of raw-material slurries each having a different distribution of the volume-based cumulative particle diameter of the thermal spray particles and a mixing step of preparing the thermal spray slurry having a filling rate of 84 mass % or less by mixing the plurality of types of raw-material slurries prepared at the raw-material slurry preparation step so that the filling rate is 84 mass % or less.

Such a method of manufacturing thermal spray slurry by mixing a plurality of types of raw-material slurries enables easy adjustment of the particle diameter distribution by mixing the plurality of types of raw-material slurries, and so thermal spray slurry having the filling rate of 84 mass % or less can be manufactured easily.

Raw-material slurries may be prepared by dispersing thermal spray particles in a dispersion medium. A plurality of groups of thermal spray particles each having a different distribution of the volume-based cumulative particle diameter may be prepared, and each group may be dispersed in a dispersion medium, whereby a plurality of types of raw-material slurries may be prepared. For each type of raw-material slurries, the same type of dispersion medium may be used, or different types of dispersing media may be used if these media can be mixed. Two types or three types or more of the raw-material slurries may be mixed to manufacture the thermal spray slurry.

The thermal spray slurry has to have a filling rate of 84 mass % or less, and preferably has 81 mass % or more and 84 mass % or less. Thermal spraying using such thermal spray slurry enables the formation of a denser coating by thermal spraying while suppressing cracks and pores more. Such thermal spraying also enables the formation of a coating having better surface roughness Ra.

The following describes one example of a method for calculating the filling rate of thermal spray slurry in details. Firstly, a vessel containing thermal spray slurry is loaded on a centrifuge to separate the thermal spray particles and the dispersion medium by centrifugation, and then the thermal spray particles in the thermal spray slurry are precipitated to let the thermal spray particles form cake at the bottom of the vessel. The dispersion medium as the supernatant liquid is removed, and then the cake is taken out of the vessel. Then the mass (A) of the cake is measured.

Since this cake is wet with the dispersion medium that is difficult to separate by centrifugation, the dispersion medium in the cake is removed from the cake to dry the cake. A method for removing the dispersion medium from the cake is not limited especially, and any one of the drying methods of drying by heating, drying under reduced pressure and drying by air blow may be used, or two types or more of these drying methods may be combined for use. After removing the dispersion medium from the cake, the mass (B) of the obtained dry matter is measured. Then, the filling rate of the thermal spray slurry may be calculated by the above-stated expression. When a space is filled with thermal spray particles in thermal spray slurry, the filling rate of the thermal spray slurry indicates the percentage of a space fillable with the thermal spray particles relative to the entire space.

Types of the thermal spray particles are not limited especially, and metal oxides (ceramics), metals, resin, cermet or the like may be used for the thermal spray particles.

Types of the metal oxides are not limited especially, and yttrium oxide ($Y_2O_3$), aluminum oxide ($Al_2O_3$), silicon oxide ($SiO_2$), titanium oxide ($TiO_2$), or zirconium oxide ($ZrO_2$) may be used, for example.

The concentration of the thermal spray particles in the thermal spray slurry of the present embodiment is not limited especially, and the concentration may be 5 mass % or more and 50 mass % or less, for example, and preferably 30 mass % or more and 50 mass % or less. Such a concentration of the thermal spray particles of 30 mass % or more enables a sufficiently large thickness of the coating that is manufactured from the thermal spray slurry per unit time.

The viscosity of the thermal spray slurry of the present embodiment is not limited especially, and the viscosity may be 3.7 mPa·s or more and 4.6 mPa·s or less. Such thermal spray slurry can lead to the advantageous effect of small surface roughness of the coating.

The type of the dispersion medium may include, but not particularly limited to, for example, water, an organic solvent, or a mixed solvent obtained by mixing two or more types of these solvents. The organic solvent may include, for example, alcohols such as methanol, ethanol, n-propyl alcohol, and isopropyl alcohol.

The thermal spray slurry according to this embodiment may further contain components other than the thermal spray particles and the dispersion medium as desired. For example, in order to improve performance of the thermal spray slurry, an additive may be further contained as necessary. The additive may include, for example, a dispersant, a viscosity adjusting agent, a coagulant, a re-dispersibility improver, an antifoaming agent, an antifreezing agent, an antiseptic agent, and a fungicide. The dispersant has a property of improving dispersion stability of the thermal spray particles in the dispersion medium, and includes a polymer type dispersant such as polyvinyl alcohol and a surfactant type dispersant. Such an additive may be used solely, or two or more of them may be used in combination.

The thermal spray slurry of the present embodiment manufactured in this way may be thermal-sprayed to the surface of a substrate, whereby a coating can be formed on the thermal spray target surface. Thermal spraying using the thermal spray slurry of the present embodiment enables the formation of a dense coating by thermal spraying while suppressing cracks.

Types of the substrate are not limited especially, and metals, such as aluminum, resin, ceramics may be used, for example.

EXAMPLES

The following describes the present invention more specifically by way of Examples and Comparative Examples.

Firstly yttrium oxide particles as the thermal spray particles were mixed in water as the dispersion medium for dispersion, whereby three types of raw-material slurries (raw-material slurry 1, raw-material slurry 2, and raw-material slurry 3) were prepared. All of the raw-material slurries 1, 2 and 3 had the concentration of yttrium oxide particles of 30 mass %. The raw-material slurries 1, 2 and 3 each had a different distribution of volume-based cumulative particle diameter of yttrium oxide particles.

The raw-material slurry 1 had 3% particle diameter D3 in the distribution of volume-based cumulative particle diameter of yttrium oxide particles of 0.3 μm, 50% particle diameter D50 of 1.8 μm, and 97% particle diameter D97 of 7.2 μm.

The raw-material slurry 2 had D3 of the yttrium oxide particles of 0.5 μm, D50 of 2.6 μm, and D97 of 7.3 μm.

The raw-material slurry 3 had D3 of the yttrium oxide particles of 0.8 μm, D50 of 6.4 μm, and D97 of 14.6 μm.

Next the raw-material slurries 1, 2 and 3 were mixed appropriately to prepare seven types of thermal spray slurries. Table 1 shows the combination of the raw-material slurries to be mixed and their mixture ratio. All of the seven types of thermal spray slurries had the concentration of yttrium oxide particles of 30 mass %. Table 1 shows the average particle diameter of yttrium oxide particles in the seven types of thermal spray slurries (i.e., D50) and the viscosity of the seven types of thermal spray slurries.

D3, D50 and D97 as stated above are particle diameters having the cumulative frequency counted from a smaller particle diameter in the volume-based distribution of cumulative particle diameter that are 3%, 50% and 97%, respectively. These D3, D50, D97 and volume-based distribution of cumulative particle diameter were measured with a laser diffraction/scattering type particle-diameter distribution measurement device LA-300 produced by Horiba, Ltd. The viscosity of the thermal spray slurry was measured with a B-type viscometer.

The filling rate of the seven types of thermal spray slurries was calculated as follows. Firstly thermal spray slurry was poured into a vessel for a centrifuge, and the vessel was loaded at the centrifuge. The centrifuge used was the centrifuge CP56G produced by Hitachi Koki Co., Ltd. (maximum rotary speed: 56000 rpm, voltage: 200 V, CUP: 30 A, product number: N0008). After the operation of this centrifuge at the temperature of 25° C. and the rotary speed of 20000 rpm for 10 hours, yttrium oxide particles were separated from the dispersion medium and precipitated to be compressed at a lower part of the vessel. Thereby a cake of the yttrium oxide particles was formed.

The dispersion medium as the supernatant liquid at an upper part of the vessel (a part above the cake) was removed. A method for removing the dispersion medium as the supernatant liquid is not limited especially, and this was removed as follows. Firstly the dispersion medium was roughly removed using a pipette, and then the dispersion medium adhered to the inner wall of the vessel and left on the cake was removed by sucking with filter paper. To suck the dispersion medium left on the cake with filter paper, the dispersion medium separated from the cake only was sucked so as not to touch the cake with the filter paper. If the filter paper comes in contact with the cake, the dispersion medium held between yttrium oxide particles of the cake also will be sucked with the filter paper, which may cause an error of the calculated value of the filling rate. After removing the dispersion medium as the supernatant liquid, then the cake was taken out of the vessel. Then the mass (A) of the cake was measured.

Next, the cake was placed in a drier to heat the cake at 120° C. for 24 hours to remove the dispersion medium from the cake. The drier used was ADVANTEC FC-610 FORCED CONVENTIONAL OVEN produced by Toyo Engineering Works, Ltd.

Then, the mass (B) of the obtained dry matter of the cake was measured, and the filling rate was calculated by the above expression. Table 1 shows the mass (A) of cake, the mass (B) of dry matter and the filling rate of each of the seven types of thermal spray slurries.

the presence or not of cracks, density (porosity) and surface roughness Ra were evaluated. Firstly the presence or not of cracks was evaluated as follows.

A substrate having the coating formed was cut, and was embedded into a two-type mixed curable resin. Then, the obtained embedded body was polished to mirror-polish the cross section of the coating. The presence or not of cracks was checked by observing this cross section with a scanning electron microscope. Table 1 shows the result. Table 1 shows the mark x for the coating having cracks and the mark o for the coating not having cracks.

Density (porosity) was evaluated as follows. An image of the cross section of the coating in the embedded body used for the evaluation of the cracks was captured to 1000-fold using a microscope. The obtained image data was analyzed using image analysis software Image-Pro Plus produced by Nippon Roper K.K. to calculate the porosity. Image analysis was to binarize an image to separate a part of the pores and

TABLE 1

|  |  | Comp. Ex. 1 | Comp. Ex. 2 | Ex. 1 | Ex. 2 | Ex. 3 | Ex. 4 | Ex. 5 |
|---|---|---|---|---|---|---|---|---|
| Mixed ratio of raw-material slurries (mass %) | Raw-material slurry 1 | 100 | 75 | 50 | 25 | 0 | 0 | 0 |
|  | Raw-material slurry 2 | 0 | 25 | 50 | 75 | 75 | 50 | 25 |
|  | Raw-material slurry 3 | 0 | 0 | 0 | 0 | 25 | 50 | 75 |
| Calculated filling rate | Mass of cake A (g) | 40.2 | 40.2 | 40.6 | 40.5 | 41.1 | 42.0 | 42.5 |
|  | Mass of dry matter B (g) | 34.0 | 33.8 | 33.9 | 33.9 | 33.8 | 33.8 | 33.9 |
|  | Filling rate (mass %) | 84.6 | 84.1 | 83.5 | 83.6 | 82.2 | 80.6 | 79.6 |
| Average particle diameter of thermal spray slurry (μm) |  | 1.8 | 2.0 | 2.2 | 2.5 | 3.3 | 4.1 | 5.2 |
| Viscosity of thermal spray slurry (cP) |  | — | 4.8 | 4.6 | 4.0 | 3.7 | 2.1 | — |
| Presence of cracks |  | X | X | ○ | ○ | ○ | ○ | ○ |
| Porosity |  | X | X | ○ | ○ | ○ | Δ | Δ |
| Surface roughness Ra |  | ○ | ○ | ○ | ○ | ○ | Δ | Δ |

Next, a substrate was prepared, and each of the seven types of thermal spray slurries was thermal-sprayed to the substrate to form a coating on the surface (thermal spray target surface) of the substrate. This substrate was made of aluminum. The surface of the substrate for thermal spraying (thermal spray target surface) underwent abrasive blasting to have the surface roughness Ra of 1.1 μm.

The surface roughness (arithmetic average roughness) Ra was measured according to the method specified in JIS B0601. More specifically the surface roughness Ra was measured at five points selected at random of the surface of the substrate (thermal spray target surface) using a surface roughness meter "SV-3000S CNC" produced by Mitutoyo Corporation, and the average of the surface roughness Ra at the measured five points was used as the surface roughness Ra of the surface of the substrate (thermal spray target surface). The standard length and the cutoff value were 0.8 mm.

Thermal spraying using such thermal spray slurry was performed using a plasma thermal spraying device 100HE produced by Progressive Surface Corporation. The conditions of thermal spraying were as follows.

Flow rate of argon gas: 180 NL/min.
Flow rate of nitrogen gas: 70 NL/min.
Flow rate of hydrogen gas: 70 NL/min.
Plasma output power: 105 kW
Thermal spraying distance: 76 mm
Traverse speed: 1500 mm/s
Thermal spraying angle: 90°
Slurry feeding rate: 38 mL/min.
Number of passes: 50

Next, the thermal sprayed coating formed on the substrates by thermal spraying was evaluated. More specifically, a part of solid phase, and the porosity (%) was calculated, which was defined as the ratio of the area of the part of the pores to the overall cross-sectional area. Table 1 shows the result. Table 1 shows the mark x when cracks were generated at the coating and so measurement of the porosity failed, the mark Δ when the porosity exceeded 1% and was 3% or less, and the mark o when the porosity was 1% or less.

Surface roughness Ra was evaluated as follows. The surface roughness (arithmetic average roughness) Ra of the coating formed by thermal spraying on the substrate was measured by the method specified in JIS B0601. More specifically surface roughness Ra was measured at five points selected at random of the surface of the coating using a surface roughness meter "SV-3000S CNC" produced by Mitutoyo Corporation, and the average of the surface roughness Ra at the measured five points was used as the surface roughness Ra of the coating. The standard length and the cutoff value were 0.8 mm respectively. Table 1 shows the result. Table 1 shows the mark o when the measurement of surface roughness Ra was less than 0.8 μm, and the mark Δ when the measurement was 0.8 μm or more and 1.5 μm or less.

As is understood from the result of Table 1, the coatings in Comparative Examples 1 and 2 had cracks generated, and so the measurement of porosity failed. On the contrary, the coatings in Examples 1 to 5 had no cracks, small porosity and excellent surface roughness. Especially Examples 1 to 3 had particularly small porosity and very excellent surface roughness.

The invention claimed is:
1. Thermal spray slurry comprising:
   at least two raw material slurries comprising thermal spray particles having a different distribution of vol- ume-based cumulative particle diameter and an average particle diameter of 1 μm or more and 10 μm or less; and a dispersion medium in which the thermal spray particles are dispersed, the thermal spray slurry having a filling rate of 84 mass % or less, the filling rate being calculated by the following expression, filling rate (mass %)=$B/A$×100, where A denotes mass of a cake of the thermal spray particles obtained by precipitating the thermal spray particles out of the thermal spray slurry by centrifugation at a temperature of 25° C. at a rotary speed of 20,000 rpm for 10 hours, and B denotes mass of a dry matter obtained by removing the dispersion medium from the cake by heating the cake at 120° C. for 24 hours.

2. The thermal spray slurry according to claim 1, wherein the thermal spray slurry has a filling rate of 81 mass % or more and 84 mass % or less.

3. The thermal spray slurry according to claim 2, wherein the thermal spray slurry has viscosity of 3.7 mPa·s or more and 4.6 mPa·s or less.

4. The thermal spray slurry according to claim 2, wherein the thermal spray particles are particles of metal oxide.

5. The thermal spray slurry according to claim 4, wherein the metal oxide is yttrium oxide.

6. The thermal spray slurry according to claim 1, wherein the thermal spray slurry has viscosity of 3.7 mPa·s or more and 4.6 mPa·s or less.

7. The thermal spray slurry according to claim 6, wherein the thermal spray particles are particles of metal oxide.

8. The thermal spray slurry according to claim 7, wherein the metal oxide is yttrium oxide.

9. The thermal spray slurry according to claim 1, wherein the thermal spray particles are particles of metal oxide.

10. The thermal spray slurry according to claim 9, wherein the metal oxide is yttrium oxide.

\* \* \* \* \*